Aug. 17, 1926.
D. R. SCHOLES
ELECTRIC CURRENT COLLECTOR
Filed Dec. 1, 1921
1,596,557
2 Sheets-Sheet 2
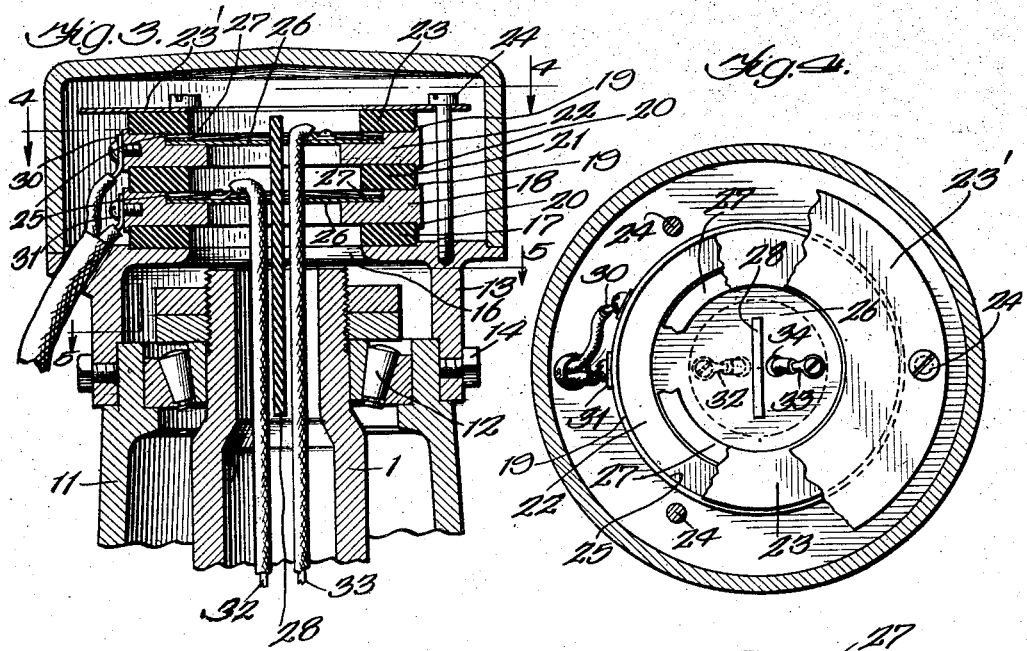
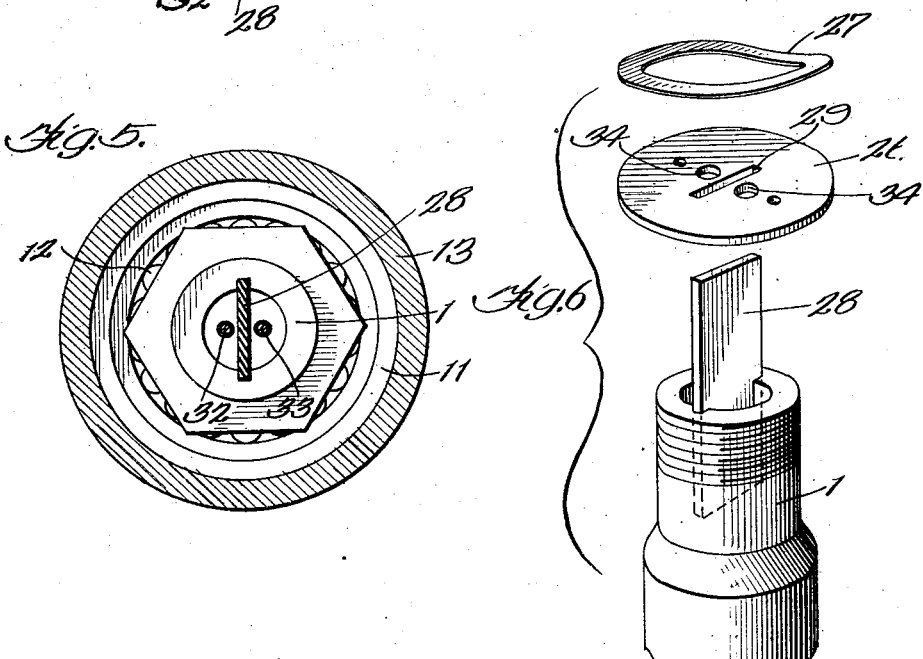
Inventor:
Daniel R. Scholes
By G. L. Gragg Atty.

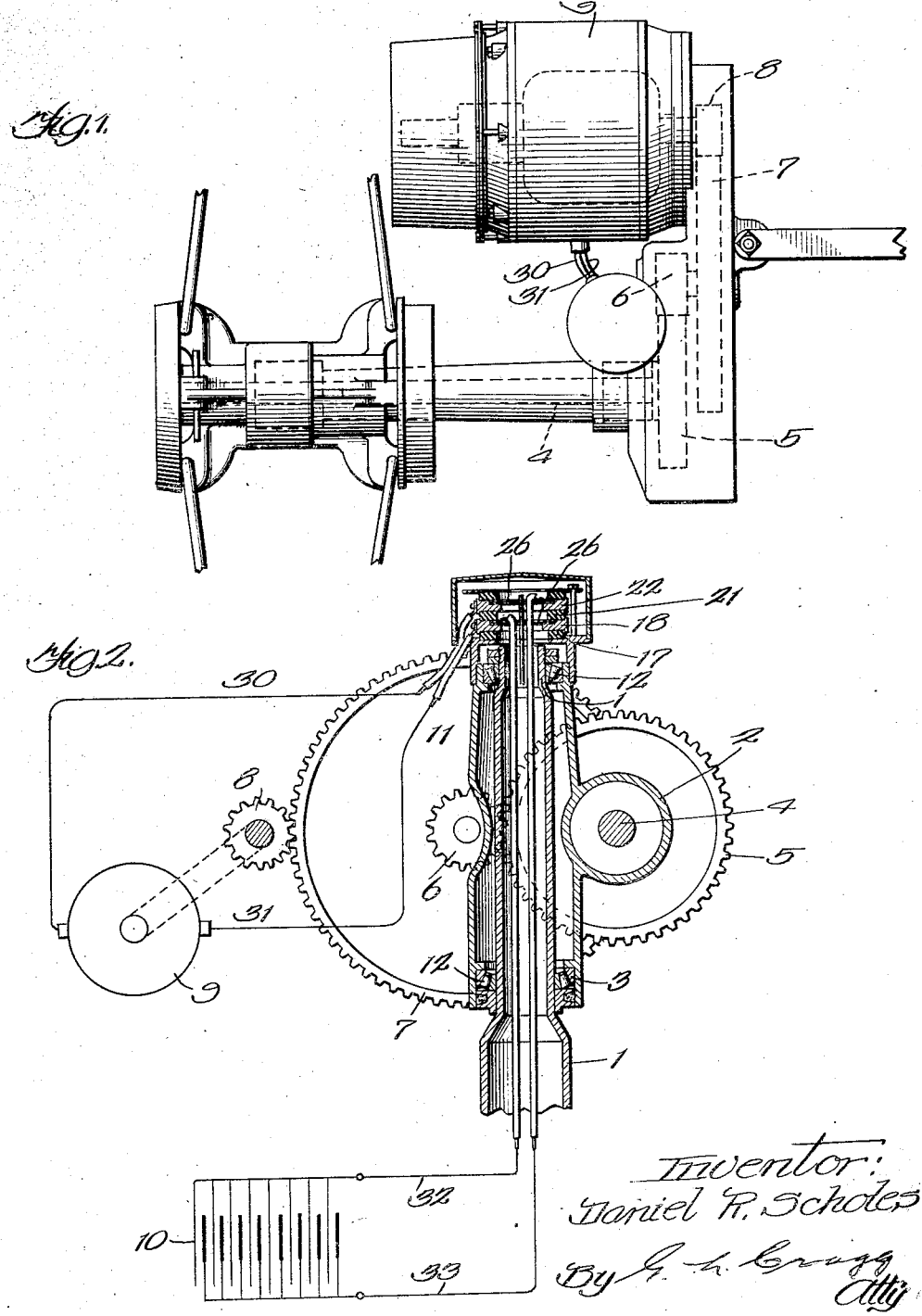

Patented Aug. 17, 1926.

1,596,557

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

ELECTRIC-CURRENT COLLECTOR.

Application filed December 1, 1921. Serial No. 519,149.

My invention relates to electric current collectors and has a number of objects and advantages in view. The collector of my invention includes at least one current conducting ring and a terminal current conducting plate bearing upon a face of the ring, these elements being relatively rotatable. In metallic circuits there are two such rings with current conducting plates respectively individual thereto.

In one embodiment of the invention the rings and plates are horizontally arranged with the plates preferably bearing upon the rings by gravity. The conductors leading to the plates depend therefrom to add their weight to the plates and thereby increase the contacting pressure. Springs are also preferably employed to supplement gravity in effecting contacting pressure between the plates and rings.

The electric current collector of my invention is of particular service when employed in connection with windmills that are arranged to drive electric current generators for the purpose of furnishing charging current to storage batteries and when my invention is thus employed the contacting rings are arranged to turn with the windmill head and the contacting plates are arranged to be stationary, the conductors leading to the contacting plates extending through the hollow mast of the mill. By holding the current conducting plates from rotation they are prevented from creeping as the rings turn beneath them so that the conductors leading to the plates do not become twisted. The means for holding the plates from rotation desirably resides in a mechanical connection that is fastened upon the mast of the mill and which passes through the bores of the rings into fixed connection with the plates. This mechanical connection is desirably a bar or plate of insulation and it is interposed between the conductors leading to the plates further to guard against any short circuiting connection therebetween.

I will explain my invention in all of its aspects by reference to the accompanying drawings showing the preferred embodiment thereof and in which Fig. 1 is a plan view of a part of a windmill structure illustrating the hub portion of the wind wheel, a part of the windmill head and the generator upon the head; Fig. 2 is a vertical sectional view illustrating the upper portion of the windmill structure and the bearing by which the windmill effects rotation of the generator armature, the wind wheel being omitted for the sake of clearness, this figure also illustrating a storage battery brought into circuit relation with the generator by means of the current collector of my invention; Fig. 3 is a vertical sectional view through the current collector of my invention that is disposed at the top of the windmill structure, this figure being essentially an enlargement of the upper portion of Fig. 2; Fig. 4 is a sectional view on line 4—4 of Fig. 3, with parts broken away; Fig. 5 is a sectional view on line 5—5 of Fig. 3; and Fig. 6 is a perspective view showing the upright shaft upon which the windmill head turns, the plate of insulation on this shaft that is employed for the purpose of holding the plates in rotation, one of said plates, and a spring washer that is employed for holding this plate in contact with the conducting ring complemental thereto, the spring washer and plate being shown separated from each other and from the other parts illustrated in this figure.

Like parts are indicated by similar characters of reference throughout the different figures.

The portion of the windmill structure shown includes an upright tubular column 1 whose reduced upper end constitutes an upright shaft affording an upright axis about which the windmill head 2 may turn upon a step bearing 3 supported upon the lower column portion. The mill head carries the wind wheel shaft 4 upon which there is a spur gear 5. It also carries a pinion 6 that is in mesh with the spur gear 5 and is in fixed relation with another spur gear 7 that is in mesh with a pinion 8 that is also upon the mill head. The armature of the generator 9 is co-axial with and fixed with respect to the pinion 8 and has its brushes connected with the storage battery 10 through the intermediation of the current collector of my invention.

This current collector is carried at the upper end of the tubular portion 11 of the mill head, this tubular portion being furnished upon the tubular column 1 to be coaxial therewith, the roller bearing structures 12 being preferably interposed between the tubular extension 11 and the tubular column

1. A table 13 is fixed upon the upper end of the tubular extension 11 by means of the bolts 14, this table having a circular opening 16 that is concentric with the tubular column 1 and the tubular extension 11. A horizontal ring of insulation 17 is fitted within an annular seat that is upon the table and is concentric with the table opening 16 and the tubular elements 1 and 11. A current conducting ring of metal 18 is formed with an upwardly extending annular rim 19 and a downwardly extending annular rim 20, the latter encompassing and being in snug fit with the insulating ring 17. Another insulating horizontal ring 21 is surrounded by and is in snug fit with the rim 19. Another horizontal current conducting ring 22 is similar in construction to the current conducting ring 18 and is sandwiched between the insulating ring 21 and another horizontal insulating ring 23, the arrangement and engagement of these three rings 21, 22 and 23 being similar to the arrangement and engagement of the rings 17, 18 and 21. The bores of all of the rings are co-axial with each other and with the tubular elements 1 and 11 and are maintained in this relation due to the nesting construction and engagement of the rings. The assembly of the rings is further maintained by means of the annular top plate 23' and bolts 24 passing therethrough into the table 13.

An annular recess 25 is formed where each conducting ring is in engagement with an insulating ring, this recess being preferably formed in such conducting ring itself. Each recess 25 contains a circular plate or disc 26 of metal and as said recesses are in the top sides of the rings having them each plate 26 therein rests thereupon by gravity, the action of gravity being preferably supplemented by a spring washer 27 located above each disc 26 and pressing upon the same and upon the insulating ring above. The plates 26 are held from rotation with respect to each other and are also preferably held from rotation with respect to the tubular column 1 by means of a mechanical connection in the form of a bar of insulation 28. This plate is inserted within diametrically opposite slots in the upper end of the tubular column 1 and passes through oblong openings 29 in the plates 26 so that such plates cannot turn with respect to the tubular column nor with respect to each other. The conducting wires 30, 31 that include the generator in circuit are respectively connected with the conducting rings 22 and 18. The conductors 32, 33 that connect the storage battery in circuit are connected with the plates 26. The lower plate 26 has two openings 34 through which both conductors pass and the upper plate 26 has but one such opening through which the conductor 33 passes. The conductors 32, 33 are screwed into connection with the plates 26 to which they are individual, upon the top sides of these plates. The bar of insulation 28 passes through the bores of both rings and between the conductors, the conductor 32 passing through the bore of only one ring 18 while the conductor 33 passes through the bores of both rings. The weight of the conductors that are pendant from the plates 26 supplements the weight of these plates to maintain them in contact with the current conducting rings to which these plates are respectively individual and as the mechanical connection 28 prevents the plates from rotating the conductors do not become twisted together and as the element 28 is desirably formed of insulation it further guards against the short circuiting connection of the conductors 32, 33. The spring washers 27 further insure intimate contact between the plates 26 and the current conducting rings.

While the rings of the current collector of my invention are shown as being horizontally disposed in order that gravity may play its part in maintaining good connection between the co-operating contact portions of the collector, I do not wish to be limited to this arrangement of such rings nor do I wish to be limited to the employment of my current collector in conjunction with windmills.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. An electric current collector comprising a rotatable terminal current conducting member carrying a plurality of conducting rings, fixed rings each contacting with one of the first mentioned rings, and a fixed supporting member having a member of insulation fixed therein which has sliding engagement with said fixed rings to hold same from rotation.

2. An electric current collector comprising a rotatable terminal current conducting member carrying a plurality of conducting rings, fixed rings each contacting with the first mentioned rings, a fixed supporting member having a member of insulation fixed therein which has sliding engagement with said fixed rings and holds them from rotation, and spring washers adapted to press against said fixed rings and hold them in pressure contact with the first mentioned rings.

3. An electric current collector comprising a rotatable terminal current conducting member carrying a plurality of conducting rings, fixed rings each contacting with the first mentioned rings, a fixed tubular supporting member having a member of insulation fixed therein which has sliding engagement with said fixed rings to hold same from rotation and current conducting leads connected to said fixed rings and extending through said tubular supporting member.

4. An electric current collector comprising a rotatable terminal conducting member carrying a plurality of conducting rings, fixed rings contacting with one of the first mentioned rings, a fixed tubular supporting member having a member of insulation fixed therein which has sliding engagement with said fixed rings and holds them from rotation, current conducting leads connected to said fixed rings and extending through said tubular supporting member and spring washers adapted to press against said fixed rings and hold them in pressure contact with the first mentioned rings.

In witness whereof I hereunto subscribe my name this 16th day of November, A. D., 1921.

DANIEL R. SCHOLES.